US010004100B2

(12) United States Patent
Fukuta et al.

(10) Patent No.: US 10,004,100 B2
(45) Date of Patent: *Jun. 19, 2018

(54) MOBILE COMMUNICATION SYSTEM, USER TERMINAL, AND PROCESSOR

(71) Applicant: KYOCERA CORPORATION, Kyoto (JP)

(72) Inventors: Noriyoshi Fukuta, Yokohama (JP); Kugo Morita, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 45 days.

This patent is subject to a terminal disclaimer.

(21) Appl. No.: 14/901,371

(22) PCT Filed: Jun. 13, 2014

(86) PCT No.: PCT/JP2014/065789
§ 371 (c)(1),
(2) Date: Dec. 28, 2015

(87) PCT Pub. No.: WO2014/208370
PCT Pub. Date: Dec. 31, 2014

(65) Prior Publication Data
US 2016/0157292 A1    Jun. 2, 2016

(30) Foreign Application Priority Data

Jun. 26, 2013 (JP) .................................. 2013-134377

(51) Int. Cl.
*H04W 4/00*    (2018.01)
*H04W 76/06*    (2009.01)
(Continued)

(52) U.S. Cl.
CPC ....... *H04W 76/068* (2013.01); *H04W 76/043* (2013.01); *H04W 76/23* (2018.02); *H04W 76/38* (2018.02); *H04W 92/18* (2013.01)

(58) Field of Classification Search
CPC .......... H04W 72/042; H04W 72/0453; H04W 72/0413; H04L 5/0007; H04L 5/0053
(Continued)

(56) References Cited

U.S. PATENT DOCUMENTS 5,802,472 A     9/1998  Taniguchi
2004/0148406 A1*  7/2004  Shima .................... H04L 29/06
                                          709/228
(Continued)

FOREIGN PATENT DOCUMENTS

| JP | H09-74588      | 3/1997 |
| JP | H11-127258 A   | 5/1999 |
| JP | 2004-260258 A  | 9/2004 |

OTHER PUBLICATIONS

An Office Action; "Notice of Reasons for Rejection," issued by the Japanese Patent Office dated Jul. 26, 2016, which corresponds to Japanese Patent Application No. 2013-134377 and is related to U.S. Appl. No. 14/901,371; with English language statement of relevance.
(Continued)

*Primary Examiner* — Joshua Kading
*Assistant Examiner* — Atique Ahmed
(74) *Attorney, Agent, or Firm* — Studebaker & Brackett PC

(57) ABSTRACT

A UE 100-1 and a UE 200-2 perform D2D communication that is direct device to device communication. The UE 100-1 transmits a D2D termination preliminary notification indicating that termination of the D2D communication is wished to the UE 100-2 during the D2D communication. The UE 100-1 terminates the D2D communication after transmitting the D2D termination preliminary notification.

6 Claims, 13 Drawing Sheets

(51) Int. Cl.
*H04W 76/04* (2009.01)
*H04W 4/02* (2018.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2004/0157590 | A1* | 8/2004 | Lazaridis | H04L 29/12301 455/415 |
| 2007/0291748 | A1* | 12/2007 | Ichiki | H04L 12/66 370/356 |
| 2011/0134028 | A1* | 6/2011 | Hiroshima | H04L 12/1827 345/156 |
| 2012/0309367 | A1* | 12/2012 | Takagi | H04L 12/40013 455/414.1 |
| 2013/0322276 | A1* | 12/2013 | Pelletier | H04W 72/085 370/252 |
| 2014/0068023 | A1* | 3/2014 | Arickan | H04L 61/2015 709/220 |

OTHER PUBLICATIONS

International Search Report and Written Opinion; issued in PCT/JP2014/065789; dated Sep. 9, 2014.
3GPP TR 22.803 V12.1.0 (Mar. 2013), 3rd Generation Partnership Project; Technical Specification Group Services and System Aspects; Feasibility study for Proximity Services (ProSe) (Release 12), 3GPP Organizational Partners, 2013.
3GPP TSG-RAN WGI Meeting #73, R1-132115, Fukuoka, Japan May 20-24, 2013.
3GPP TSG-RAN WG1 #72bis, R1-131215, Chicago, USA, Apr. 15-19.

\* cited by examiner

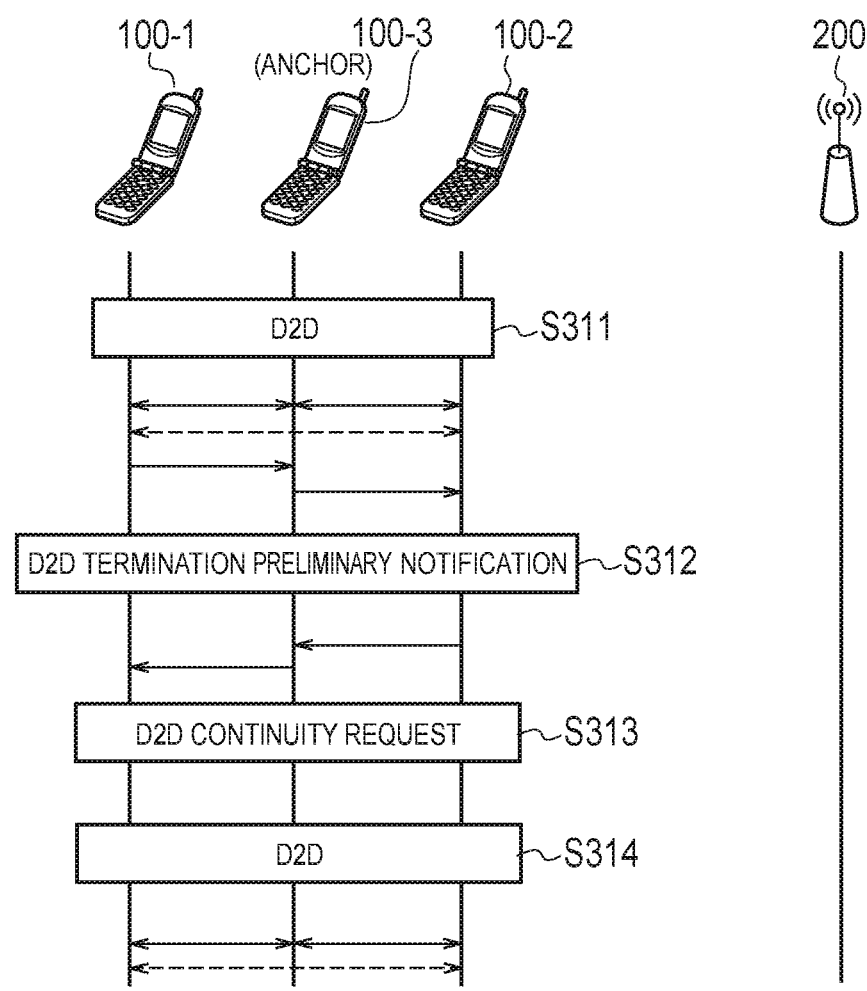

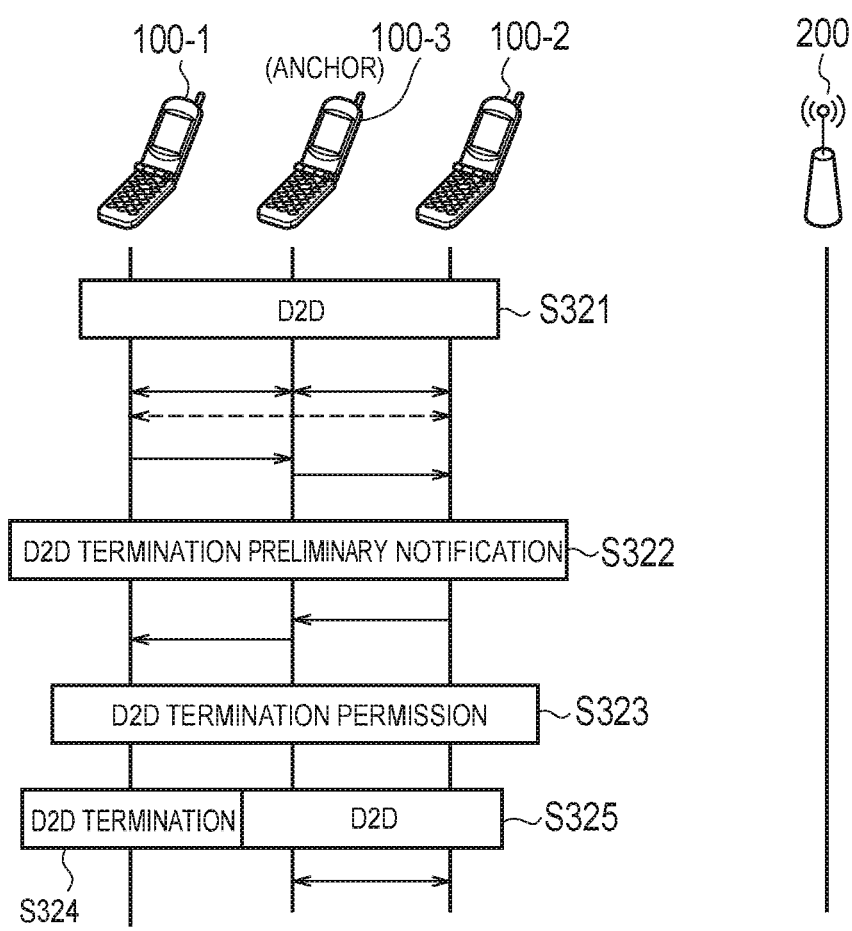

MOBILE COMMUNICATION SYSTEM, USER TERMINAL, AND PROCESSOR

TECHNICAL FIELD

The present invention relates to a mobile communication system, a user terminal, and a processor supporting device to device (D2D) communication.

BACKGROUND ART

In 3GPP (3rd Generation Partnership Project) which is a project aiming to standardize a mobile communication system, it has been studied to introduce device to device (D2D) communication as a new feature after Release 12 (see Non Patent Document 1).

In D2D communication, a plurality of neighboring user terminals performs direct communication without passing through a base station. That is, a data path of D2D communication does not pass through a base station. On the other hand, a data path for normal communication (cellular communication) in a mobile communication system passes through a base station.

PRIOR ART DOCUMENT

Non-Patent Document

Non Patent Document 1: 3GPP technical report "TR 22.803 V12.1.0", March 2013

SUMMARY OF THE INVENTION

However, when another user terminal that is a counterpart terminal for D2D communication terminates D2D communication without permission, a user terminal does not recognize that the D2D communication becomes impossible. Due to this, there is a problem that the user terminal maintains a waiting state for receiving data from the another user terminal or the user terminal transmits data to the another user terminal even when the another user terminal does not receive data.

In view of the above, the present invention provides a mobile communication system, a user terminal, and a processor, which can prevent the user terminal from performing useless processing by termination of D2D communication of a counterpart terminal in D2D communication.

A mobile communication system according to a first aspect comprises: a first user terminal and a second user terminal configured to perform D2D (Device to Device) communication that is direct device to device communication. The first user terminal transmits a D2D termination preliminary notification indicating that the first user terminal wishes termination of the D2D communication to the second user terminal during the D2D communication. The first user terminal terminates the D2D communication after transmitting the D2D termination preliminary notification.

A user terminal according to a second aspect performs D2D (Device to Device) communication that is direct device to device communication with another user terminal. The user terminal comprises: a controller configured to transmit a D2D termination preliminary notification indicating that the user terminal wishes termination of the D2D communication to the another user terminal during the D2D communication. The controller terminates the D2D communication after transmitting the D2D termination preliminary notification.

A processor according to a third aspect is provided in a user terminal configured to perform D2D (Device to Device) communication that is direct device to device communication with another user terminal. The processor performs: a process of transmitting a D2D termination preliminary notification indicating that the user terminal wishes termination of the D2D communication to the another user terminal during the D2D communication; and a process of terminating the D2D communication after transmission of the D2D termination preliminary notification.

BRIEF DESCRIPTION OF THE DRAWINGS

FIG. 14 is a sequence diagram illustrating an operation pattern 2 according to a third embodiment.

FIG. 15 is a sequence diagram illustrating an operation pattern 3 according to a third embodiment.

DESCRIPTION OF THE EMBODIMENT

[Overview of Embodiment]

Figure 1:
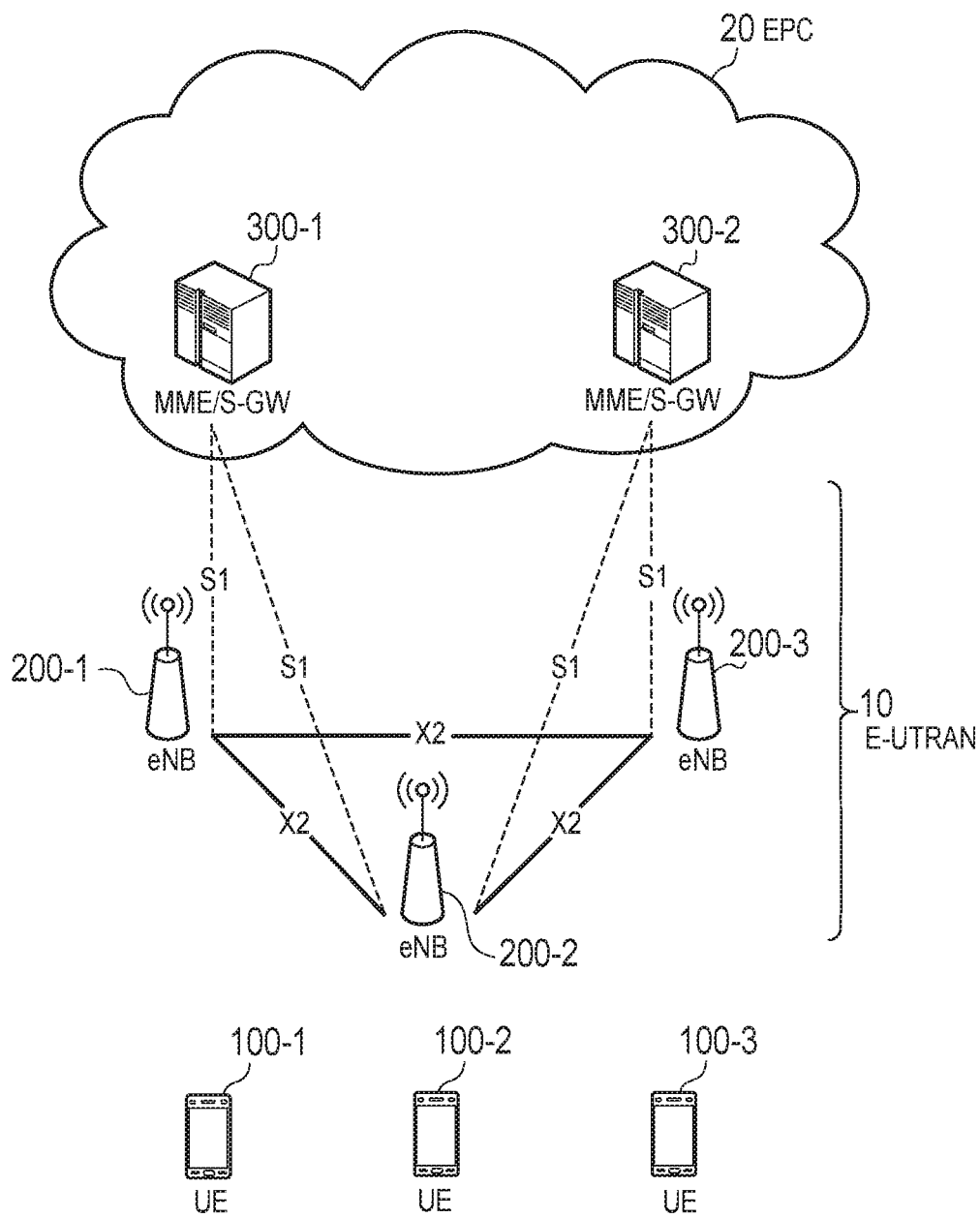
FIG. 1 is a diagram illustrating a configuration of an LTE system according to a first embodiment to a third embodiment.

A mobile communication system according to a first embodiment to a third embodiment comprises: a first user terminal and a second user terminal configured to perform D2D (Device to Device) communication that is direct device to device communication. The first user terminal transmits a D2D termination preliminary notification indicating that the first user terminal wishes termination of the D2D communication to the second user terminal during the D2D communication. The first user terminal terminates the D2D communication after transmitting the D2D termination preliminary notification.

In a first embodiment, the first user terminal transmits the D2D termination preliminary notification when data to be transmitted to the second user does not exist in the D2D communication.

In a first embodiment, a case where data to be transmitted does not exist is a case where the first user terminal terminates an application used in the D2D communication.

In a first embodiment, the second user terminal, which has received the D2D termination preliminary notification, transmits a D2D continuity request requesting continuity of the D2D communication to the first user terminal when it is determined that continuity of the D2D communication is wished.

In a first embodiment, the second user terminal, which has received the D2D termination preliminary notification, determines that continuity of the D2D communication is wished, when data to be transmitted to the first user terminal exists or when the second user terminal is waiting for reception of a specific signal associated with the first user terminal.

In a first embodiment, the first user terminal, which has received the D2D continuity request, is prohibited from transmitting the D2D termination preliminary notification until a first predetermined period has elapsed after reception of the D2D continuity request.

In a first embodiment, the first user terminal terminates the D2D communication when the first user terminal does not receive the D2D continuity request until the second predetermined period has elapsed after transmission of the D2D termination preliminary notification.

In a first embodiment, the second user terminal, which has received the D2D termination preliminary notification, transmits a D2D termination permission notification permitting termination of the D2D communication to the first user terminal when the second user terminal permits the first user terminal to terminate the D2D communication.

In a second embodiment, the first user terminal measures a D2D communication time indicating a time during which the D2D communication is continued, or a D2D data amount indicating an amount of data transmitted and/or received in the D2D communication. The first user terminal transmits D2D measurement information indicating at least one of the D2D communication time and the D2D data amount to a network, when the first user terminal terminates the D2D communication.

In a second embodiment, the first user terminal measures the D2D communication time or the D2D data amount when performing the D2D communication by using a frequency band managed by an operator.

In a third embodiment, it comprises an anchor terminal configured to representatively perform communication with a network for the D2D communication. The anchor terminal is the second user terminal or another user terminal which performs the D2D communication. The first user terminal measures a D2D communication time indicating a time during which the D2D communication is continued, or a D2D data amount indicating an amount of data transmitted and/or received in the D2D communication. The first user terminal transmits D2D measurement information indicating at least one of the D2D communication time and the D2D data amount to the anchor terminal, when the first user terminal terminates the D2D communication.

In a third embodiment, it comprises an anchor terminal configured to representatively perform communication with a network for the D2D communication. The anchor terminal is another user terminal which performs the D2D communication. The first user terminal transmits the D2D termination preliminary notification to the second user terminal through the anchor terminal. The second user terminal transmits the D2D continuity request to the first user terminal through the anchor terminal.

In a third embodiment, it comprising an anchor terminal configured to representatively perform communication with a network for the D2D communication. The anchor terminal is another user terminal which performs the D2D communication. The first user terminal transmits the D2D termination preliminary notification to the second user terminal through the anchor terminal. The second user terminal transmits the D2D termination permission notification to the first user terminal through the anchor terminal.

A user terminal according to a first embodiment to a third embodiment performs D2D (Device to Device) communication that is direct device to device communication with another user terminal. The user terminal comprises: a controller configured to transmit a D2D termination preliminary notification indicating that the user terminal wishes termination of the D2D communication to the another user terminal during the D2D communication. The controller terminates the D2D communication after transmitting the D2D termination preliminary notification.

A processor according to a first embodiment to a third embodiment is provided in a user terminal configured to perform D2D (Device to Device) communication that is direct device to device communication with another user terminal. The processor performs: a process of transmitting a D2D termination preliminary notification indicating that the user terminal wishes termination of the D2D communication to the another user terminal during the D2D communication; and a process of terminating the D2D communication after transmission of the D2D termination preliminary notification.

[First Embodiment]

Hereinafter, a description will be provided for an embodiment in a case where the present invention is applied to an LTE system.

(System Configuration)

FIG. 1 is a configuration diagram of an LTE system according to the first embodiment. As illustrated in FIG. 1, the LTE system includes UEs (User Equipment) 100, EUTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a connecting cell (serving cell). A configuration of the UE 100 will be described below in detail.

The E-UTRAN 10 corresponds to a radio access network. The E-UTRAN 10 includes eNBs 200 (evolved Node-B). The eNB 200 corresponds to a base station. The eNBs 200 are connected to one another via an X2 interface. A configuration of the eNB 200 will be described below in detail.

Each eNB 200 manages one or a plurality of cells and performs radio communication with the UE 100 which establishes a connection with the cell of the eNB 200. The eNB 200, for example, has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The E-UTRAN 10 and the EPC 20 configure a network of the LTE system. The EPC 20 includes a plurality of MME (Mobility Management Entity)/S-GWs (Serving-Gateway) 300. The MME performs various mobility controls and the like for the UE 100. The S-GW performs transfer control of user data. The MME/S-GW 300 is connected to eNB 200s via an S1 interface.

Figure 2:
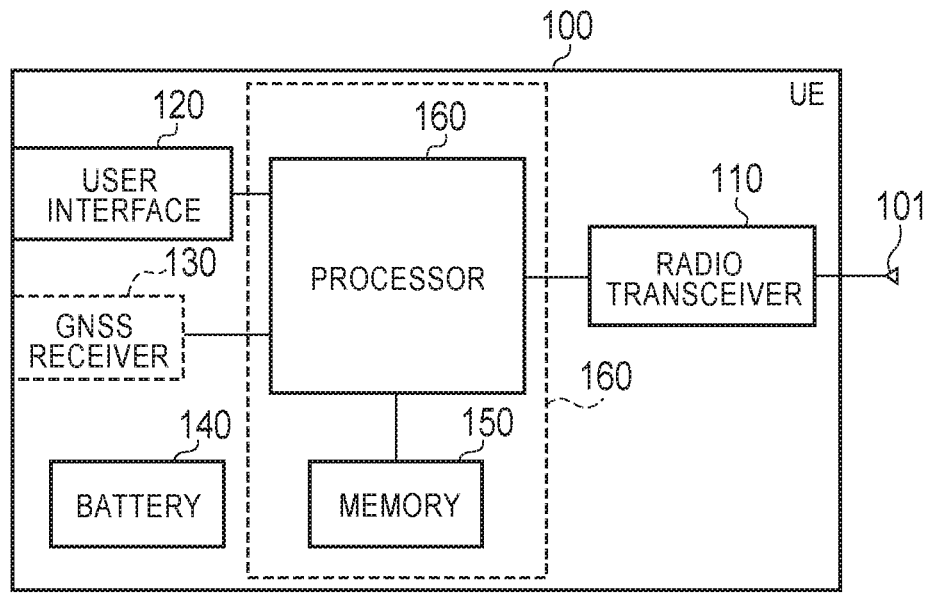
FIG. 2 is a block diagram of a UE according to a first embodiment to a third embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not have the GNSS receiver 130. Furthermore, the memory 150 may be integrally formed with the processor 160, and this set (that is, a chip set) may be called a processor 160'.

The plurality of antennas 101 and the radio transceiver 110 are used to transmit and receive a radio signal. The radio transceiver 110 converts a baseband signal (transmission signal) output from the processor 160 into the radio signal, and transmits the radio signal from the plurality of antennas 101. Furthermore, the radio transceiver 110 converts the radio signal received by the plurality of antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols, which will be described later.

Figure 3:
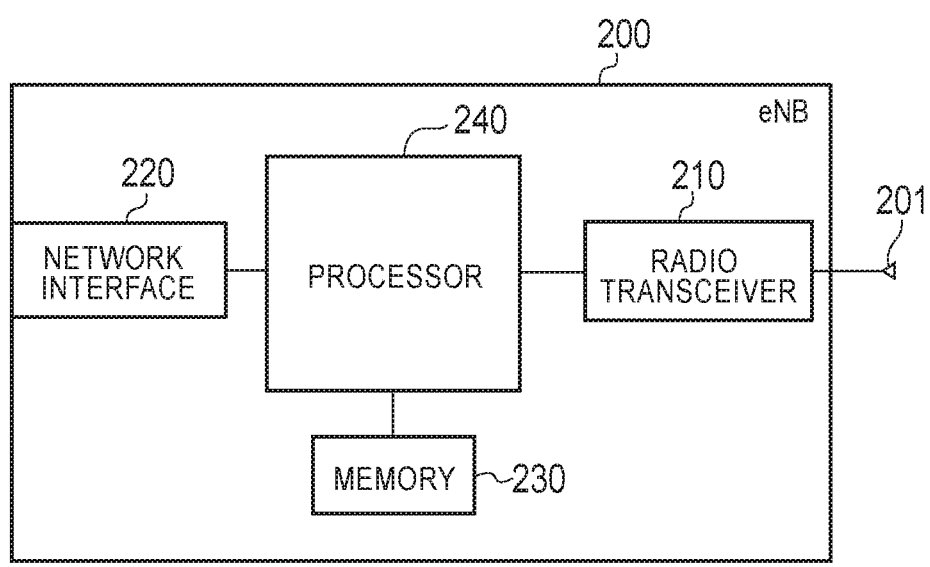
FIG. 3 is a block diagram of an eNB according to a first embodiment to a third embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller.

The plurality of antennas 201 and the radio transceiver 210 are used to transmit and receive a radio signal. The radio transceiver 210 converts a baseband signal (transmission signal) output from the processor 240 into the radio signal, and transmits the radio signal from the plurality of antennas 201. Furthermore, the radio transceiver 210 converts the radio signal received by the plurality of antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols, which will be described later.

Figure 4:
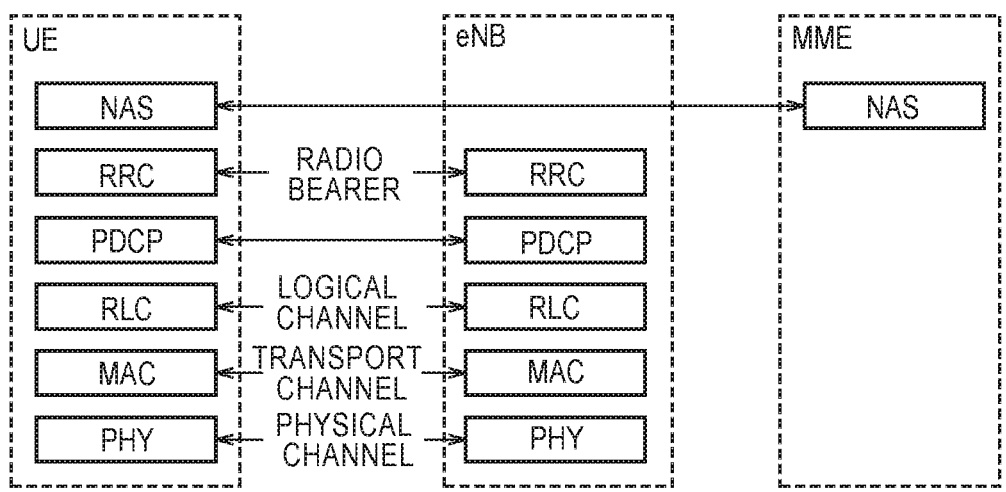
FIG. 4 is a protocol stack diagram of radio interface according to a first embodiment to a third embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes an MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a transport format of an uplink and a downlink (a transport block size and a modulation and coding scheme) and a scheduler for determining a resource block to be assigned to the UE100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is an connection (RRC connection) between the RRC of the UE 100 and the RRC of the eNB 200, the UE 100 is in a connected state (an RRC connected state), and when there is no connection (no RRC connection), the UE 100 is in an idle state (an RRC idle state).

An NAS (Non-Access Stratum) layer positioned above the RRC layer performs session management, mobility management and the like.

Figure 5:
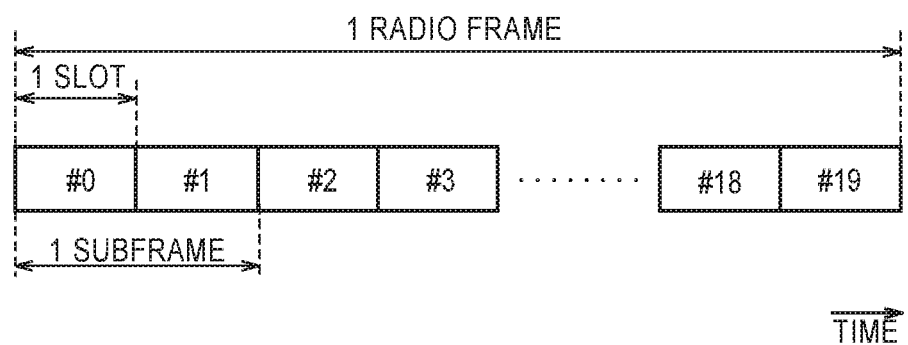
FIG. 5 is a configuration diagram of a radio frame according to a first embodiment to a third embodiment.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. Each resource block includes a plurality of subcarriers in the frequency direction. A radio resource unit is configured by one subcarrier and one symbol and one subcarrier.

Among radio resources allocated to the UE 100, a frequency resource can be configured by a resource block and a time resource can be configured by a subframe (or slot).

In the DL, an interval of several symbols from the head of each subframe is a region used as a physical downlink control channel (PDCCH) for mainly transmitting a control signal. Furthermore, the other portion of each subframe is a region available as a physical downlink shared channel (PDSCH) for mainly transmitting user data.

In the UL, both ends in the frequency direction of each subframe are regions used as a physical uplink control channel (PUCCH) for mainly transmitting a control signal. The central portion of each subframe is a region available as a physical uplink shared channel (PUSCH) for mainly transmitting user data.

(D2D Communication)

An LTE system according to a first embodiment supports D2D communication that is direct device to device communication (UE to UE communication). In this case, the D2D communication will be described in comparison with cellular communication that is normal communication of the LTE system. The cellular communication is a communication mode in which a data path passes through a network (E-UTRAN 10, EPC 20). The data path refers to a communication path of user data. On the contrary, the D2D communication is a communication mode in which a data path established between UEs does not pass through a network.

Figure 6:
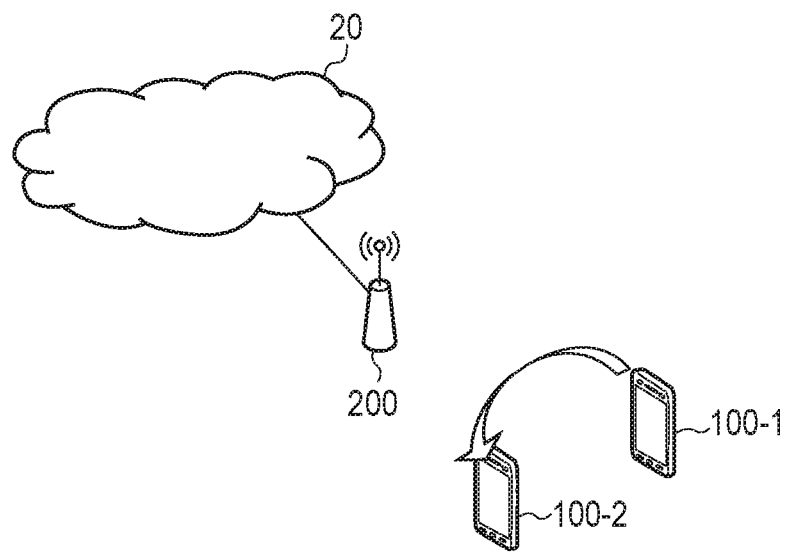
FIG. 6 is a diagram for describing D2D communication according to a first embodiment to a third embodiment.

FIG. 6 is a diagram for describing D2D communication.

As illustrated in FIG. 6, in the D2D communication, a data path does not pass through an eNB 200. A UE 100-1 and a UE 100-2 which are adjacent to each other perform direct radio communication with low transmission power in a cell of the eNB 200. In this way, the UE 100-1 and the UE 100-2 which are adjacent to each other perform direct radio communication with low transmission power, reducing power consumption in the UEs 100 and reducing interference to an adjacent cell. Also, there are a case where D2D communication is performed in a state in which the UE 100 in an idle state and a case where D2D communication is performed in a state in which the UE 100 in a connected state.

(Operation According to First Embodiment)

(1) Operation Overview

An LTE system according to a first embodiment includes a UE 100-1 (first user terminal) and a UE 100-2 (second user terminal), which perform D2D communication that is direct device to device communication. The UE 100-1 transmits a D2D termination preliminary notification indicating that termination of the D2D communication is wished to the UE 100-2 during D2D communication. The UE 100-1 terminates D2D communication after transmitting the D2D termination preliminary notification. Therefore, the UE 100-2 can know that the UE 100-1 wishes termination of D2D communication. Accordingly, it is possible to prevent the UE 100-2 from terminating D2D communication unexpectedly.

In the first embodiment, when data to be transmitted to the UE 100-2 in D2D communication does not exist, the UE 100-1 transmits the D2D termination preliminary notification. A case where the data to be transmitted does not exist may be a case where the UE 100-1 terminates an application used in D2D communication. Therefore, the UE 100-1 can appropriately determine whether to notify the UE 100-2 that the UE 100-1 wishes termination of D2D communication.

In the first embodiment, when determining that continuity of the D2D communication is wished, the UE 100-2 which has received the D2D termination preliminary notification transmits the D2D continuity request requesting D2D communication to the UE 100-1. Therefore, the UE 100-1 can grasp that the UE 100-2 wishes continuity of D2D communication. Accordingly, it is possible to continue D2D communication without termination of D2D communication according to the wish of the UE 100-2.

In the first embodiment, when data to be transmitted to the UE 100-1 exists or when the UE 100-2 is waiting for reception of a specific signal associated with the UE 100-1, the UE 100-2, which has received the D2D termination preliminary notification, determines that continuity of D2D communication with the UE 100-1 is wished. The specific signal is, for example, a response signal from the UE 100-1 in an application used in the D2D communication. Therefore, the UE 100-2 can appropriately determine whether to notify the UE 100-1 that the UE 100-2 wishes continuity of D2D communication.

In the first embodiment, the UE 100-1, which has received the D2D continuity request, is prohibited from transmitting a D2D termination preliminary notification until the first predetermined period has elapsed after reception of the D2D continuity request. Therefore, it is possible to reduce possibility that transmission of the D2D termination preliminary notification by the UE 100-1 would be useless, and suppress increases in a processing load and a resource use amount, due to transmission of the D2D termination preliminary notification.

In the first embodiment, the UE 100-1 terminates the D2D communication when the UE 100-1 does not receive the D2D continuity request until the second predetermined period has elapsed after transmission of the D2D termination preliminary notification. Therefore, when it can be considered that the UE 100-2 does not wish continuity of D2D communication, the UE 100-1 can terminate D2D communication.

Alternatively, in the first embodiment, the UE 100-2 which has received the D2D termination preliminary notification transmits a D2D termination permission notification permitting termination of D2D communication to the UE 100-1 when permitting the UE 100-1 to terminate D2D communication. Therefore, in a state in which the UE 100-1 has confirmed that the UE 100-2 does not wish continuity of D2D communication, the UE 100-1 can terminate D2D communication.

Hereinafter, operation patterns 1 to 3 according to a first embodiment will be described. In the operation patterns 1 to 3, it is assumed that three UEs 100 (UE 100-1 to UE 100-3) perform D2D communication. It should be noted that the number of UEs 100 which perform D2D communication may be two or more than three.

(2) Operation Pattern 1

Figure 7:
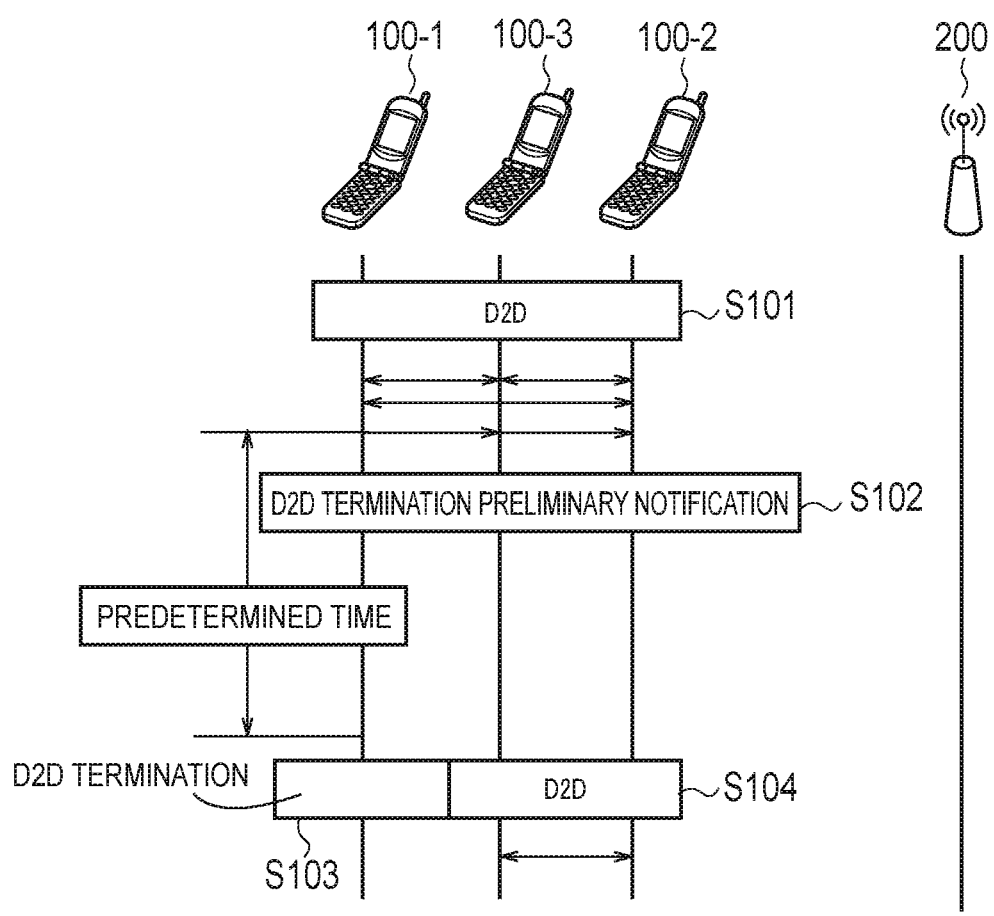
FIG. 7 is a sequence diagram 1 illustrating an operation pattern 1 according to a first embodiment.

FIG. 7 is a sequence diagram 1 illustrating an operation pattern 1 according to a first embodiment. In this case, it is assumed that each UE 100 performs D2D communication in an idle state.

As illustrated in FIG. 7, in step S101, a UE 100-1 to a UE 100-3 which are in an idle state perform D2D communication.

In step S102, the UE 100-1 transmits a D2D termination preliminary notification indicating that termination of D2D communication is wished to the UE 100-2 and the UE 100-3 during the D2D communication. When data to be transmitted to the UE 100-2 in D2D communication does not exist, the UE 100-1 transmits the D2D termination preliminary notification. In this regard, a case where the data to be transmitted does not exist may be a case where the UE 100-1 terminates an application used in D2D communication. Also, when the UE 100-1 transmits the D2D termination preliminary notification, the UE 100-1 starts a timer corresponding to a second predetermined period.

The UE 100-2 and the UE 100-3 which have been received the D2D termination preliminary notification determine whether continuity of D2D communication with the UE 100-1 is wished. For example, when data to be transmitted to the UE 100-1 exists or when the UE 100-2 and the UE 100-3 is waiting for reception of a specific signal associated with the UE 100-1, the UE 100-2 and the UE 100-3 determine that continuity of D2D communication with the UE 100-1 is wished. In this case, a description will be given under the assumption that the UE 100-2 and the UE 100-3 do not wish continuity of D2D communication with the UE 100-1.

In step S103, when confirming that the timer corresponding to the second predetermined period is expired, the UE 100-1 terminates the D2D communication. As described above, in the operation pattern 1, the UE 100-1 terminates the D2D communication when the UE 100-1 does not receive the D2D continuity request until the second predetermined period has elapsed after transmission of the D2D termination preliminary notification.

On the other hand, in step S104, the UE 100-2 and the UE 100-3 continue the D2D communication.

Although it is assumed in FIG. 7 that the UE 100 performs the D2D communication in an idle state, the sequence of FIG. 7 may be changed in a case where the UE 100 performs the D2D communication in a connected state.

Figure 8:
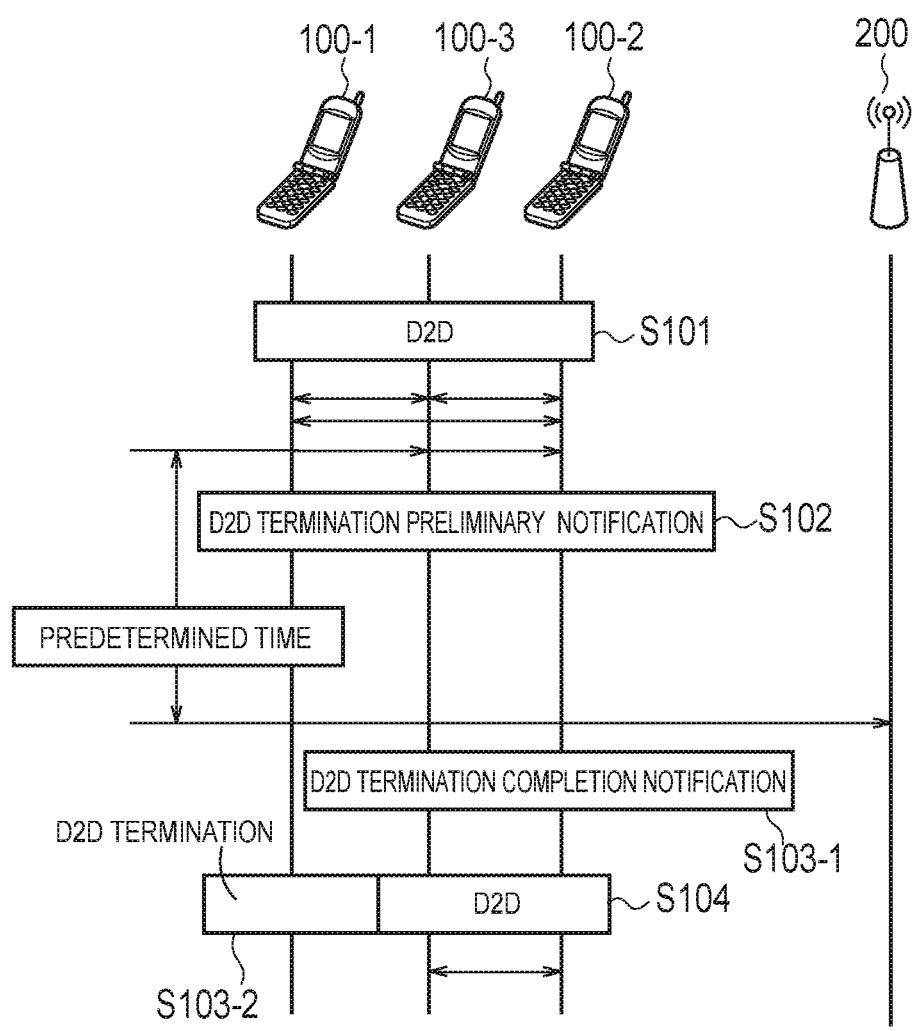
FIG. 8 is a sequence diagram 2 illustrating an operation pattern 1 according to a first embodiment.

FIG. 8 is a sequence diagram 2 illustrating an operation pattern 1 according to a first embodiment. In this case, differences from FIG. 7 in a case where each UE 100 performs D2D communication in a connected state will be mainly described.

As illustrated in FIG. 8, in step S101, a UE 100-1 to a UE 100-3, which are in a connected state to a cell of an eNB 200, perform D2D communication.

In step S102, the UE 100-1 transmits a D2D termination preliminary notification indicating that termination of D2D communication is wished to the UE 100-2 and the UE 100-3 during the D2D communication. Also, when the UE 100-1 transmits the D2D termination preliminary notification, the UE 100-1 starts a timer corresponding to a second predetermined period.

The UE 100-2 and the UE 100-3, which have been received the D2D termination preliminary notification, determine whether continuity of D2D communication with the UE 100-1 is wished. In this case, a description will be given under the assumption that the UE 100-2 and the UE 100-3 do not wish continuity of D2D communication with the UE 100-1.

In step S103-1, when confirming that a timer corresponding to a second predetermined period is expired, the UE 100-1 transmits a D2D termination completion notification indicating completion of processing to terminate the D2D communication to the eNB 200. Also, in step S103-2, the UE 100-1 terminates the D2D communication. The eNB 200, which has received the D2D termination completion notification from the UE 100-1, can terminate control of the D2D communication (resource allocation or the like) for the UE 100-1.

On the other hand, in step S104, the UE 100-2 and the UE 100-3 continue the D2D communication.

(3) Operation Pattern 2

Figure 9:
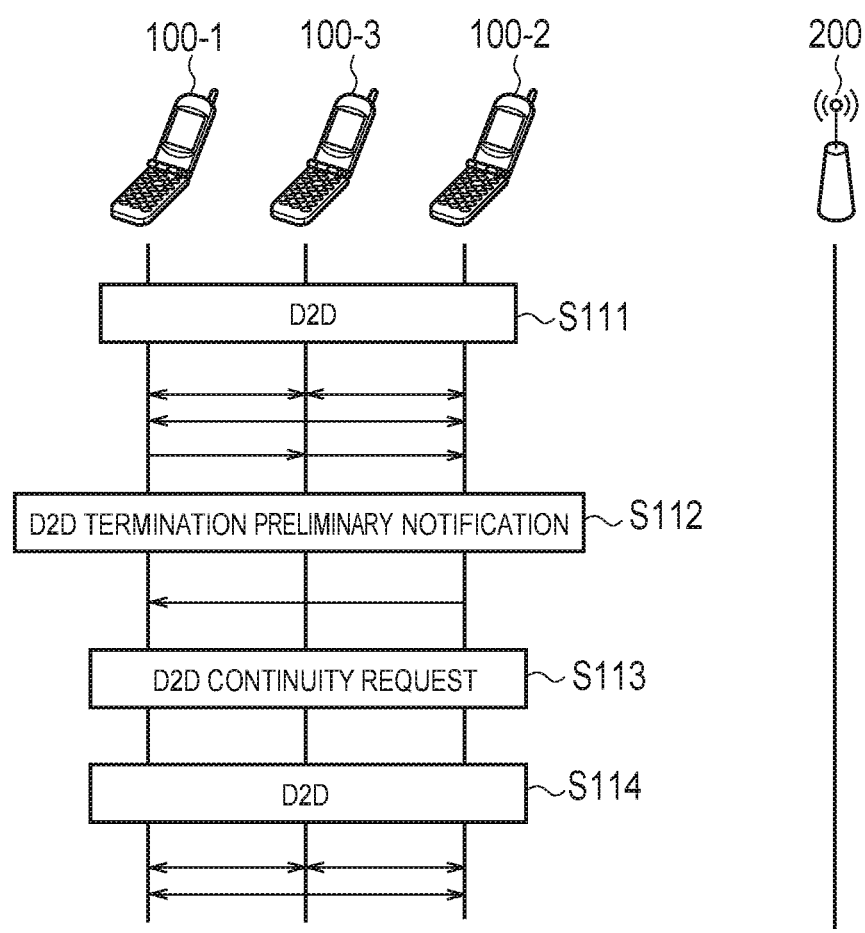
FIG. 9 is a sequence diagram illustrating an operation pattern 2 according to a first embodiment.

FIG. 9 is a sequence diagram illustrating an operation pattern 2 according to a first embodiment. In this case, it is assumed that each UE 100 performs D2D communication in an idle state or a connected state. Also, a description for the same operation as FIG. 7 will be appropriately omitted.

As illustrated in FIG. 9, in step S111, a UE 100-1 to a UE 100-3 perform D2D communication.

In step S112, the UE 100-1 transmits a D2D termination preliminary notification indicating that termination of D2D communication is wished to the UE 100-2 and the UE 100-3 during the D2D communication.

The UE 100-2 and the UE 100-3 which have been received the D2D termination preliminary notification determine whether D2D communication with the UE 100-1 is wished to be continued. In this case, a description will be given under the assumption that the UE 100-2 wishes continuity of D2D communication with the UE 100-1.

In step S113, the UE 100-2 transmits a D2D continuity request requesting continuity of the D2D communication to the UE 100-1. The UE 100-1, which has received the D2D continuity request, determines to continue the D2D communication without termination of the D2D communication according to a wish from the UE 100-2. Also, when the UE 100-1 receives the D2D continuity request, the UE 100-1 starts a timer corresponding to a first predetermined period. The UE 100-1, which has received the D2D continuity request, is prohibited from transmitting a D2D termination preliminary notification until the first predetermined period has elapsed after reception of the D2D continuity request.

In step S114, the UE 100-1 to the UE 100-3 continue the D2D communication. Also, when a request for D2D communication with the UE 100-3 not the UE 100-2 is again generated by the UE 100-1 within a predetermined time, a termination cancelling request (which is D2D continuity request) may be transmitted to the UE 100-2 and the UE 100-3.

(4) Operation Pattern 3

Figure 10:
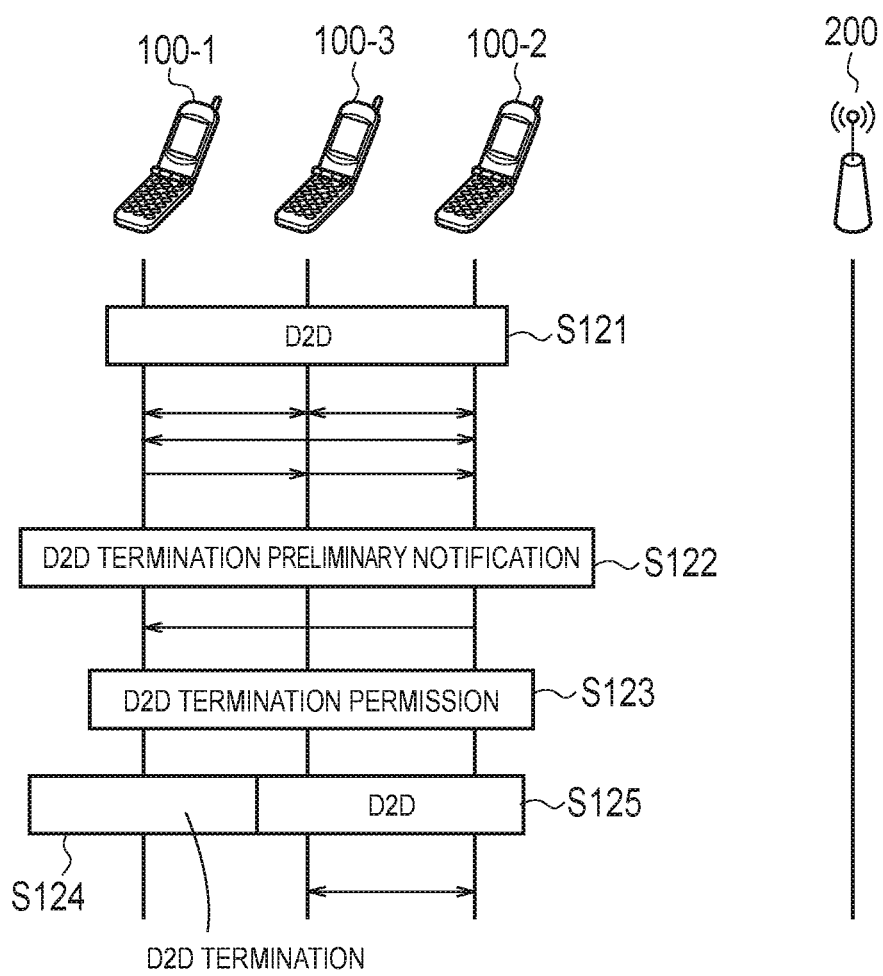
FIG. 10 is a sequence diagram 1 illustrating an operation pattern 3 according to a first embodiment.

FIG. 10 is a sequence diagram 1 illustrating an operation pattern 3 according to a first embodiment. In this case, it is assumed that each UE 100 performs D2D communication in an idle state. Also, a description for the same operation as FIG. 7 will be appropriately omitted.

As illustrated in FIG. 10, in step S121, a UE 100-1 to a UE 100-3 which are in an idle state perform D2D communication.

In step S122, the UE 100-1 transmits a D2D termination preliminary notification indicating that termination of D2D communication is wished to the UE 100-2 and the UE 100-3 during the D2D communication. In the operation pattern 3, when the UE 100-1 transmits the D2D termination preliminary notification, the UE 100-1 may not start a timer corresponding to a second predetermined period.

The UE 100-2 and the UE 100-3 which have been received the D2D termination preliminary notification determine whether D2D communication with the UE 100-1 is wished to be continued. In this case, a description will be given under the assumption that the UE 100-2 and the UE 100-3 do not wish continuity of D2D communication with the UE 100-1.

In step S123, the UE 100-2 and the UE 100-3 transmit a D2D termination permission notification permitting termination of the D2D communication to the UE 100-1.

In step S124, the UE 100-1, which has received the D2D termination permission notification from the UE 100-2 and the UE 100-3 terminates the D2D communication.

On the other hand, in step S125, the UE 100-2 and the UE 100-3 continue the D2D communication.

Although it is assumed in FIG. 10 that the UE 100 performs the D2D communication in an idle state, the sequence of FIG. 10 may be changed in a case where the UE 100 performs the D2D communication in a connection state.

Figure 11:
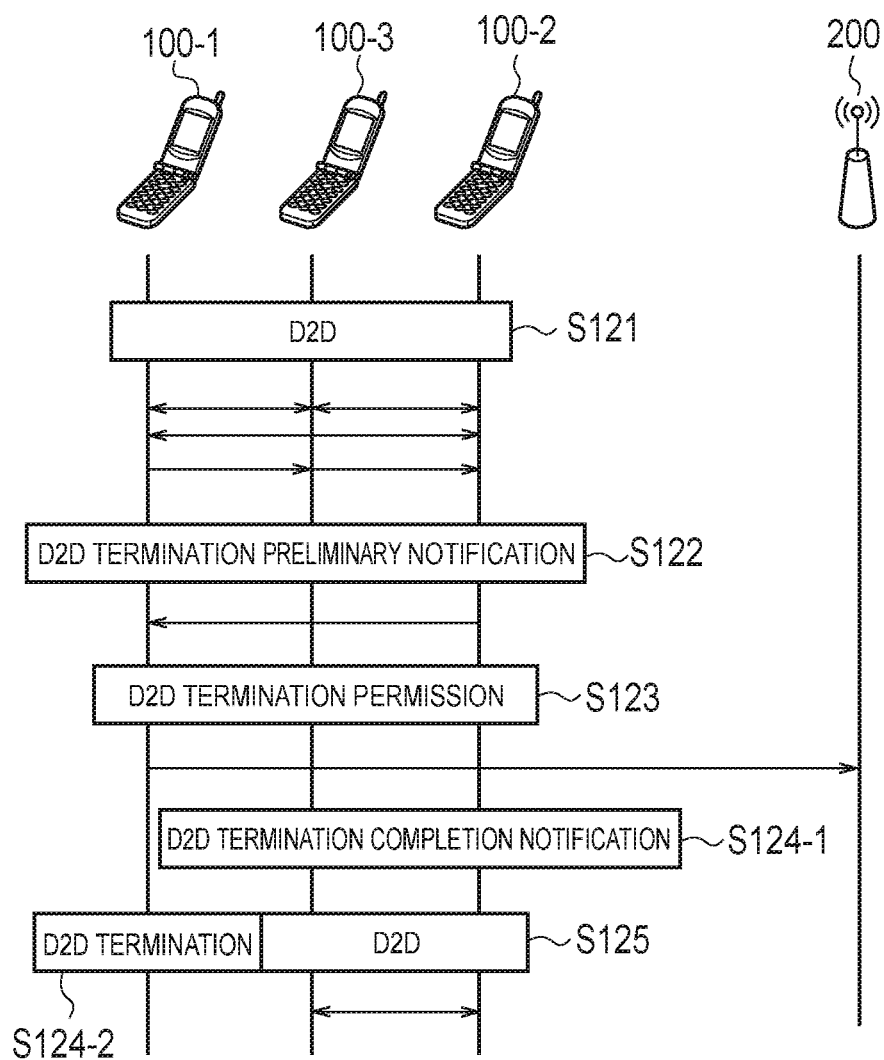
FIG. 11 is a sequence diagram 2 illustrating an operation pattern 3 according to a first embodiment.

FIG. 11 is a sequence diagram 2 illustrating an operation pattern 3 according to a first embodiment. In this case, differences from FIG. 10 in a case where each UE 100 performs D2D communication in a connected state will be mainly described.

As illustrated in FIG. 11, in step S121, a UE 100-1 to a UE 100-3, which are in a connected state to a cell of an eNB 200, perform D2D communication.

In step S122, the UE 100-1 transmits a D2D termination preliminary notification indicating that termination of D2D communication is wished to the UE 100-2 and the UE 100-3 during the D2D communication.

The UE 100-2 and the UE 100-3 which have been received the D2D termination preliminary notification determine whether D2D communication with the UE 100-1 is wished to be continued. In this case, a description will be given under the assumption that the UE 100-2 and the UE 100-3 do not wish continuity of D2D communication with the UE 100-1.

In step S123, the UE 100-2 and the UE 100-3 transmit a D2D termination permission notification permitting termination of the D2D communication to the UE 100-1.

In step S124-1, the UE 100-1, which has received the D2D termination permission notification from the UE 100-2 and the UE 100-3 transmits a D2D termination completion notification indicating completion of processing to terminate the D2D communication to the eNB 200. Also, in step S124-2, the UE 100-1 terminates the D2D communication. The eNB 200, which has received the D2D termination completion notification from the UE 100-1, can terminate control of the D2D communication (resource allocation or the like) for the UE 100-1.

On the other hand, in step S125, the UE 100-2 and the UE 100-3 continue the D2D communication.

[Second Embodiment]

Next, the second embodiment will be described while focusing on differences from the first embodiment. A system configuration according to a second embodiment is identical to that of the first embodiment.

(1) Operation Overview

In the second embodiment, the UE 100-1 measures a D2D communication time indicating a time during which D2D communication is continued, or a D2D data amount indicating an amount of data transmitted and/or received in D2D communication. When the UE 100-1 terminates the D2D communication, the UE 100-1 transmits D2D measurement information indicating at least one of the D2D communication time and the D2D data amount to a network. Therefore, the network can grasp at least one of the D2D communication time and the D2D data amount in the D2D communication in which a data path does not pass through the network, and therefore, can appropriately perform charging for the D2D communication, or the like.

(2) Operation Sequence

Figure 12:
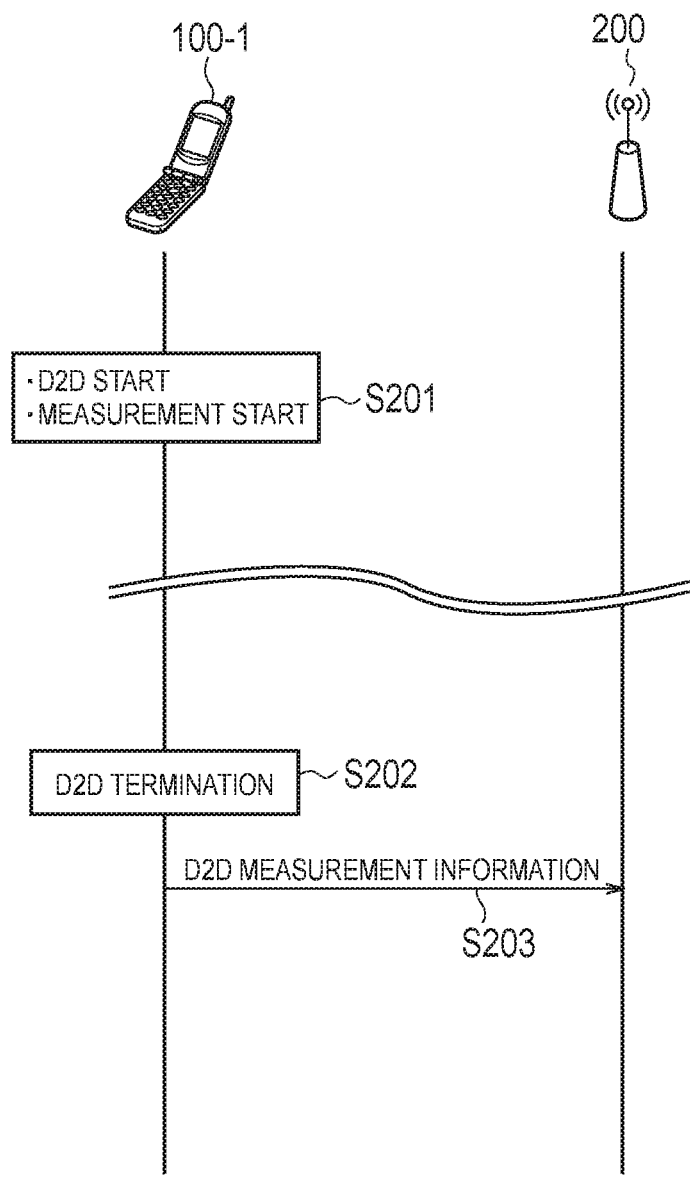
FIG. 12 is a sequence diagram illustrating an operation according to a second embodiment.

FIG. 12 is a sequence diagram illustrating an operation according to a second embodiment.

As illustrated in FIG. 12, in step S201, a UE 100-1 starts D2D communication. Also, the UE 100-1 starts measurement of a D2D communication time or a D2D data amount.

In step S202, the UE 100-1 terminates the D2D communication. Also, the UE 100-1 terminates the measurement of the D2D communication time or the D2D data amount.

In step S203, the UE 100-1 transmits the D2D measurement information indicating at least one of the D2D communication time and the D2D data amount which are measured to the network (eNB 200).

In the case of performing the D2D communication in a connected state, the UE 100-1 may transmit the D2D measurement information to the network, in response to reception of a transmission request of the D2D measurement information from the network.

In the case of performing the D2D communication in an idle state, it is possible to apply change the sequence of FIG. 12 as described below.

The UE 100-1 transmits the D2D measurement information to the network only when performing the D2D communication by using a frequency band which is managed by an operator. Therefore, the network can perform charging control in which charging is not made with respect to a frequency band which is not managed.

When transited to a connected state so as to perform cellular communication after termination of the D2D communication, the UE 100-1 may transmit the D2D measurement information to the network. Therefore, it is possible to prevent transition to the connected state only in order to transmit the D2D measurement information.

The UE 100-1 holds the D2D measurement information until the D2D measurement information can be transmitted to a network. In this case, the UE 100-1 may include a time stamp related to a measurement time point of the D2D measurement information in the D2D measurement information. Therefore, it is possible to perform charging control, such as performing charging differently dependent on time zones in which the D2D communication is performed. The time stamp may be a start time point of the D2D communication and/or an elapsed time from a termination time point.

The UE 100-1, which holds the D2D measurement information, stores information on an operator that manages frequency bands used for the D2D communication. When connected to a network (eNB 200) of the operator, the UE 100-1 may transmit the D2D measurement information to the network. Therefore, it is possible to limit a transmission destination of the D2D measurement information to an appropriate operator network.

It should be noted that the UE 100-1 may transit to the connected state immediately after termination of the D2D communication and transmit the D2D measurement information to the network, without holding the D2D measurement information.

[Third Embodiment]

Next, the third embodiment will be described while focusing on the differences from the first embodiment and the second embodiment. A system configuration according to a third embodiment is identical to that of the first embodiment.

(1) Operation Overview

In the third embodiment, there is an anchor UE which representatively performs communication with a network for D2D communication. The anchor UE is a UE 100-2 or another user terminal which performs D2D communication.

The anchor UE may be a UE 100 designated by a network from among a plurality of UEs 100 (hereinafter, referred to as a "D2D UE group") which performs D2D communication, or a UE 100 autonomously selected from the D2D UE group according to a certain selection criterion. In this case, the selection criterion is, for example, a criterion of selecting a UE 100 having the smallest or largest UE identifier. Alternatively, in the case of performing the D2D communication in a connected state, the selection criterion may be a criterion of selecting a UE 100 having the smallest or largest C-RNTI. In a case in which the anchor UE is autonomously selected based on the selection criterion, when a UE 100 which is suitable for the anchor UE is included in the D2D UE group, the anchor UE may be changed or may not be changed.

In the third embodiment, the UE 100-1 transmits a D2D termination preliminary notification to a UE 100-2 through the anchor UE. The UE 100-2 transmits a D2D continuity request to a UE 100-1 through the anchor UE.

In the third embodiment, the UE 100-1 transmits a D2D termination preliminary notification to a UE 100-2 through the anchor UE. The UE 100-2 transmits a D2D termination permission notification to a UE 100-1 through the anchor UE.

In the third embodiment, the UE 100-1 may measure a D2D communication time indicating a time during which D2D communication is continued, or a D2D data amount indicating an amount of data transmitted and/or received in D2D communication, like the second embodiment. When the UE 100-1 terminates the D2D communication, the UE 100-1 transmits D2D measurement information indicating at least one of the D2D communication time and the D2D data amount to the anchor UE. The anchor UE transmits the D2D measurement information to the network in response to reception of the D2D measurement information. Also, when the anchor UE is changed, an original anchor UE may transmit the D2D measurement information to a new anchor UE. In this way, the new anchor UE can transmit the D2D measurement information, to which D2D communication situations so far is reflected, to the network.

(2) Operation Pattern 1

Figure 13:
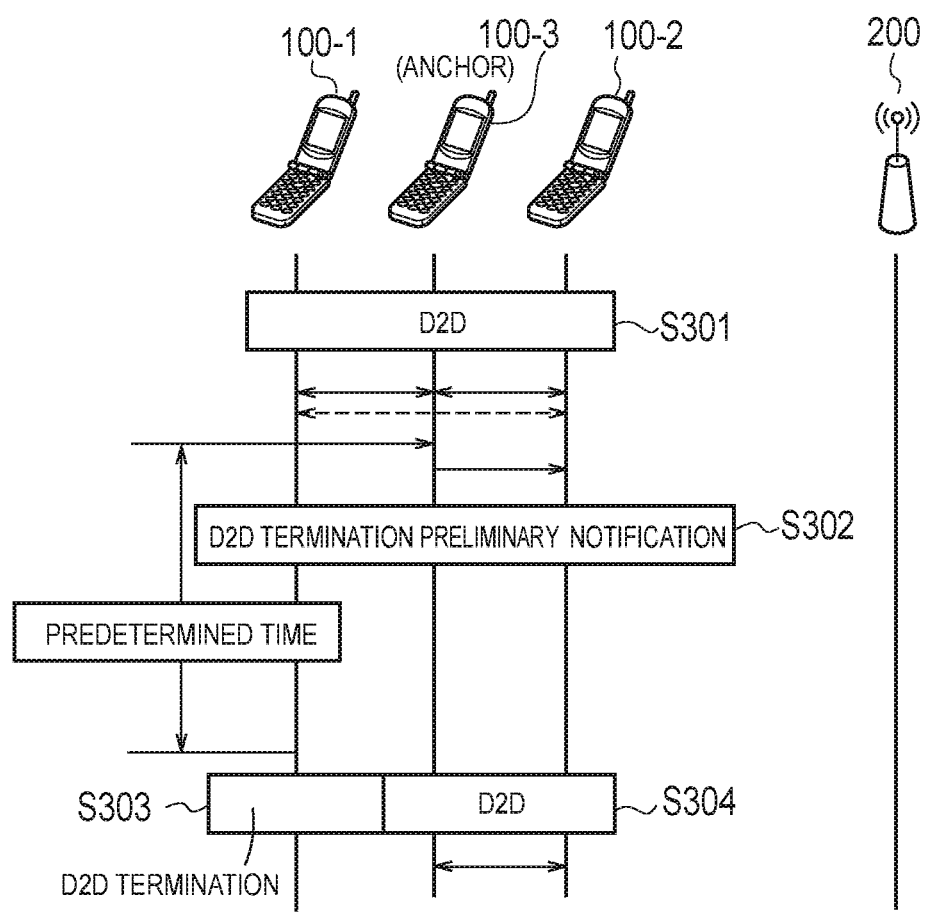
FIG. 13 is a sequence diagram illustrating an operation pattern 1 according to a third embodiment.

FIG. 13 is a sequence diagram illustrating an operation pattern 1 according to a third embodiment. In this case, it is assumed that each UE 100 performs D2D communication in an idle state. Also, a UE 100-3 is an anchor UE in a D2D UE group including a UE 100-1 to UE 100-3.

As illustrated in FIG. 13, in step S301, the UE 100-1 to the UE 100-3 which are in an idle state perform D2D communication.

In step S302, the UE 100-1 transmits a D2D termination preliminary notification representing that termination of D2D communication is wished to the UE 100-3 during the D2D communication. Also, when the UE 100-1 transmits a D2D termination preliminary notification, the UE 100-1 starts a timer corresponding to a second predetermined period. The UE 100-3 transmits the D2D termination preliminary notification received from the UE 100-1 to the UE 100-2.

The UE 100-2 and the UE 100-3 which have been received the D2D termination preliminary notification determine whether D2D communication with the UE 100-1 is wished to be continued. In this case, a description will be given under the assumption that the UE 100-2 and the UE 100-3 do not wish D2D communication with the UE 100-1 to be continued.

In step S303, when confirming that the timer corresponding to the second predetermined period is expired, the UE 100-1 terminates the D2D communication.

On the other hand, in step S304, the UE 100-2 and the UE 100-3 continue the D2D communication.

Although it is assumed in FIG. 13 that the UE 100 performs the D2D communication in an idle state, the sequence of FIG. 13 may be changed in a case where the UE 100 performs the D2D communication in a connection state. Specifically, when confirming that a timer corresponding to a second predetermined period is expired, the UE 100-1 transmits a D2D termination completion notification indicating completion of processing to terminate the D2D communication to the network (eNB 200). Alternatively, the UE 100-1 may transmit the D2D termination preliminary notification to the network through the anchor UE (UE 100-3). Then, the UE 100-1 terminates the D2D communication.

(3) Operation Pattern 2

FIG. 14 is a sequence diagram illustrating an operation pattern 2 according to a third embodiment. In this case, it is assumed that each UE 100 performs D2D communication in an idle state or a connected state. A UE 100-3 is an anchor UE in a D2D UE group including a UE 100-1 to UE 100-3. Also, a description for the same operation as FIG. 13 will be appropriately omitted.

As illustrated in FIG. 14, in step S311, a UE 100-1 to a UE 100-3 perform D2D communication.

In step S312, the UE 100-1 transmits a D2D termination preliminary notification indicating that termination of D2D communication is wished to the UE 100-3 during the D2D communication. The UE 100-3 transmits the D2D termination preliminary notification received from the UE 100-1 to the UE 100-2.

The UE 100-2 and the UE 100-3 which have been received the D2D termination preliminary notification determine whether D2D communication with the UE 100-1 is wished to be continued. In this case, a description will be given under the assumption that the UE 100-2 wishes continuity of D2D communication with the UE 100-1.

In step S313, the UE 100-2 transmits a D2D continuity request requesting continuity of the D2D communication to the UE 100-3. The UE 100-3 transmits a D2D continuity request received from the UE 100-2 to the UE 100-1. The UE 100-1, which has received the D2D continuity request, determines to continue the D2D communication without termination of the D2D communication according to a wish from the UE 100-2. Also, when the UE 100-1 receives the D2D continuity request, the UE 100-1 starts a timer corresponding to a first predetermined period. The UE 100-1, which has received the D2D continuity request, is prohibited from transmitting a D2D termination preliminary notification until the first predetermined period has elapsed after reception of the D2D continuity request.

In step S314, the UE 100-1 to the UE 100-3 continue the D2D communication.

(4) Operation Pattern 3

FIG. 15 is a sequence diagram illustrating an operation pattern 3 according to a third embodiment. In this case, it is assumed that each UE 100 performs D2D communication in an idle state. A UE 100-3 is an anchor UE in a D2D UE group including a UE 100-1 to UE 100-3. Also, a description for the same operation as FIG. 13 will be appropriately omitted.

As illustrated in FIG. 15, in step S321, the UE 100-1 to the UE 100-3 which are in an idle state perform D2D communication.

In step S322, the UE 100-1 transmits a D2D termination preliminary notification indicating that termination of D2D communication is wished to the UE 100-3 during the D2D communication. The UE 100-3 transmits the D2D termination preliminary notification received from the UE 100-1 to the UE 100-2. Also, in the operation pattern 3, when the UE 100-1 transmits the D2D termination preliminary notification, the UE 100-1 may not start a timer corresponding to a second predetermined period.

The UE 100-2 and the UE 100-3 which have been received the D2D termination preliminary notification determine whether D2D communication with the UE 100-1 is wished to be continued. In this case, a description will be given under the assumption that the UE 100-2 and the UE 100-3 do not wish continuity of D2D communication with the UE 100-1.

In step S323, the UE 100-2 transmits a D2D termination permission notification permitting termination of the D2D communication to the UE 100-3. The UE 100-3 transmits the D2D termination permission notification received from the UE 100-2 to the UE 100-1.

In step S324, the UE 100-1, which has received the D2D termination permission notification terminates the D2D communication.

On the other hand, in step S325, the UE 100-2 and the UE 100-3 continue the D2D communication.

Although it is assumed in FIG. 15 that the UE 100 performs the D2D communication in an idle state, the sequence of FIG. 15 may be changed in a case where the UE 100 performs the D2D communication in a connection state. Specifically, the UE 100-1, which has received the D2D termination permission notification, transmits the D2D termination completion notification indicating completion of processing to terminate the D2D communication to the network (eNB 200). Alternatively, the UE 100-1 may transmit the D2D termination preliminary notification to the network through the anchor UE (UE 100-3). Then, the UE 100-1 terminates the D2D communication.

[Other Embodiments]

The above-described embodiments are not limited to be performed individually and independently. They may be performed in a combination thereof.

In addition, in the above-described embodiments, the LTE system as one example of a cellular system is described; however, the present invention is not limited to the LTE system, and the present invention may be applied to a communication system other than the LTE system.

In addition, the entire content of Japanese Patent Application No. 2013-134377 (filed on Jun. 26, 2013) is incorporated in the present specification by reference.

INDUSTRIAL APPLICABILITY

According to the present invention, it provides the base station, the user terminal, and the processor which can prevent the user terminal from performing useless processing by termination of D2D communication of a counterpart terminal in D2D communication.

The invention claimed is:

1. A mobile communication system comprising:
a first user terminal and a second user terminal configured to perform Device to Device (D2D) communication for communicating user data, wherein
the first user terminal directly transmits, to the second user terminal, a preliminary notification for a termination of the D2D communication,
the first user terminal starts an operation for the termination of the D2D communication after transmitting the preliminary notification,
the second user terminal directly transmits a first notification to the first user terminal in order not to terminate the D2D communication, in response to a reception of the preliminary notification, and
the first user terminal continues the D2D communication without the termination of the D2D communication in response to a reception of the first notification before terminating the D2D communication after starting D2D communication.

2. The mobile communication system according to claim 1, wherein the first user terminal directly transmits the preliminary notification in response to having no data to be transmitted to the second user terminal by the D2D communication.

3. The mobile communication system according to claim 1, wherein the first user terminal is prohibited from transmitting a next preliminary notification until a first predetermined period has elapsed after reception of the first notification.

4. A first user terminal configured to perform Device-to-Device (D2D) communication for communicating user data with a second user terminal, comprising:
a transmitter configured to directly transmit a preliminary notification for a termination of the D2D communication,
a controller configured to start an operation for the termination of the D2D communication after transmitting the preliminary notification, and
a receiver configured to directly receive a first notification from the second user terminal, wherein
the first notification is transmitted in order not to terminate the D2D communication, in response to a reception of the preliminary notification, and
the controller is configured to continue the D2D communication without the termination of the D2D communication in response to a reception of the first notification before terminating the D2D communication after starting D2D communication.

5. A processor for controlling a first user terminal configured to perform Device-to-Device (D2D) communication for communicating user data with a second user terminal, wherein the processor performs processes of:
directly transmitting a preliminary notification for a termination of the D2D communication;
starting an operation for the termination of the D2D communication after transmitting the preliminary notification;
directly receiving a first notification from the second user terminal, wherein the first notification is transmitted in order not to terminate the D2D communication, in response to a reception of the preliminary notification; and
continuing the D2D communication without the termination of the D2D communication in response to a reception of the first notification before terminating the D2D communication after starting D2D communication.

6. The mobile communication system according to claim 1, wherein
the second user terminal determines whether or not to terminate the D2D communication,
the second user terminal directly transmits the first notification to the first user terminal in response to determining not to terminate the D2D communication,
the second user terminal directly transmits a second notification in order to terminate the D2D communication, in response to determining to terminate the D2D communication, and
the first user terminal starts an operation for the termination of the D2D communication in response to a reception of the second notification.

* * * * *